United States Patent
Kang

(10) Patent No.: US 11,250,077 B2
(45) Date of Patent: Feb. 15, 2022

(54) NATIVE OBJECT IDENTIFICATION METHOD AND APPARATUS

(71) Applicant: TENCENT TECHNOLOGY (SHENZHEN) COMPANY LIMITED, Shenzhen (CN)

(72) Inventor: Zhanhui Kang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 16/388,083

(22) Filed: Apr. 18, 2019

(65) Prior Publication Data

US 2019/0272297 A1 Sep. 5, 2019

Related U.S. Application Data

(63) Continuation of application No. PCT/CN2018/079243, filed on Mar. 16, 2018.

(30) Foreign Application Priority Data

May 19, 2017 (CN) .......................... 201710358639.0

(51) Int. Cl.
*G06F 16/951* (2019.01)
*G06F 16/906* (2019.01)
(Continued)

(52) U.S. Cl.
CPC .......... *G06F 16/951* (2019.01); *G06F 16/00* (2019.01); *G06F 16/906* (2019.01);
(Continued)

(58) Field of Classification Search
CPC .......... G06F 16/24578; G06F 16/9536; G06F 16/00; G06F 16/951; G06F 16/906; H04L 67/42; G06Q 50/00; G06Q 50/01
See application file for complete search history.

(56) References Cited

U.S. PATENT DOCUMENTS 6,233,575 B1 5/2001 Agrawal et al.
2007/0073667 A1* 3/2007 Chung ................ G06F 16/951
(Continued)

FOREIGN PATENT DOCUMENTS

| CN | 103235821 A | 8/2013 |
| CN | 103810167 A | 5/2014 |
| CN | 103914491 A | 7/2014 |

OTHER PUBLICATIONS

International Search Report dated May 30, 2018 in PCT/CN2018/079243 with concise English translation.
Written Opinion dated May 30, 2018 in PCT/CN2018/079243.

*Primary Examiner* — Etienne P Leroux
(74) *Attorney, Agent, or Firm* — Oblon, McClelland, Maier & Neustadt, L.L.P.

(57) ABSTRACT

A native object identification method is described. A first topic from a social network can be determined. The social network can be searched for M objects associated with the first topic. A frequency of appearances of each application account in the M objects is counted to obtain top N application accounts having highest frequencies of appearances. M and N can be positive integers. According to an account filter rule, a first application account is identified from the top N application accounts having highest frequencies of appearance. An object associated with the first topic and posted by the first application account is determined as a native object.

17 Claims, 3 Drawing Sheets

---

Obtain a to-be-processed first topic from a social platform, the first topic including a first topic identifier — 101

Search, according to the first topic identifier, the social platform for M objects including the first topic, M being a positive integer — 102

Count a frequency of appearance of an application account that appears in each of the M objects, to obtain top N application accounts having highest frequencies of appearance, N being a positive integer — 103

Identify, according to an account filter rule, a first application account from the top N application accounts having highest frequencies of appearance, and determine an object posted by the first application account as a native object — 104

(51) Int. Cl.
*G06F 16/9536* (2019.01)
*G06Q 50/00* (2012.01)
*G06F 16/00* (2019.01)

(52) U.S. Cl.
CPC ......... *G06F 16/9536* (2019.01); *G06Q 50/00* (2013.01); *G06Q 50/01* (2013.01)

(56) References Cited

U.S. PATENT DOCUMENTS

| | | | |
|---|---|---|---|
| 2008/0235189 A1* | 9/2008 | Rayman | G06F 16/9535 |
| 2013/0167041 A1* | 6/2013 | Huang | G06F 3/0485 |
| | | | 715/753 |
| 2014/0244614 A1* | 8/2014 | Mei | G06F 16/36 |
| | | | 707/708 |
| 2014/0324719 A1* | 10/2014 | Canal | G06F 16/958 |
| | | | 705/319 |
| 2015/0142782 A1* | 5/2015 | Moon | G06F 16/5846 |
| | | | 707/722 |
| 2015/0356165 A1* | 12/2015 | Donovan | H04L 67/42 |
| | | | 707/737 |
| 2016/0151704 A1* | 6/2016 | Wu | G06Q 50/01 |
| | | | 463/31 |
| 2016/0224675 A1* | 8/2016 | Li | G06Q 10/10 |
| 2016/0232241 A1* | 8/2016 | Stoyanov | G06F 16/9535 |
| 2017/0061469 A1* | 3/2017 | Garrity | G06Q 50/01 |
| 2017/0277691 A1* | 9/2017 | Agarwal | H04W 4/21 |
| 2017/0308962 A1* | 10/2017 | Raskin | G06F 16/3326 |
| 2018/0121399 A1* | 5/2018 | Callaghan | G06F 40/146 |
| 2018/0143980 A1* | 5/2018 | Tanikella | G06F 16/24578 |
| 2018/0174190 A1* | 6/2018 | Ferreira | G06Q 30/0246 |

* cited by examiner

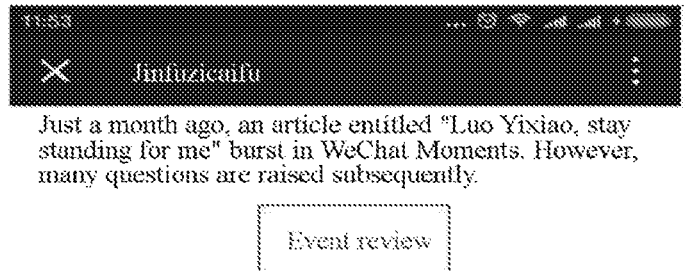
FIG. 3
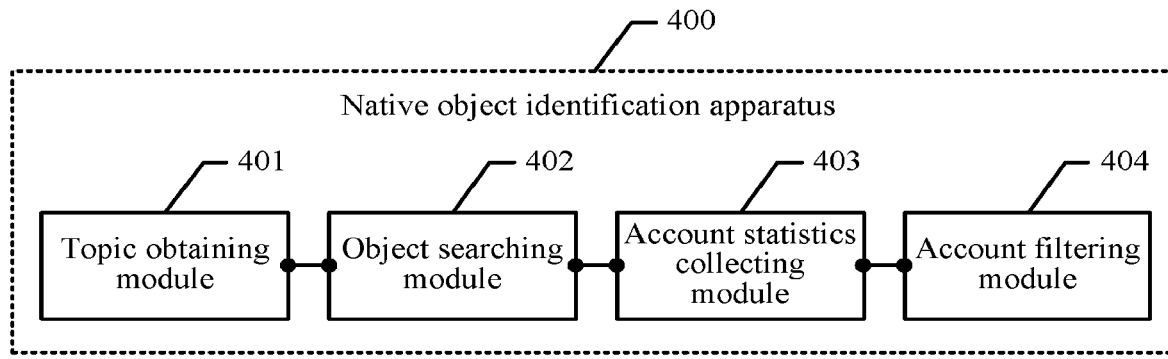
FIG. 4-a

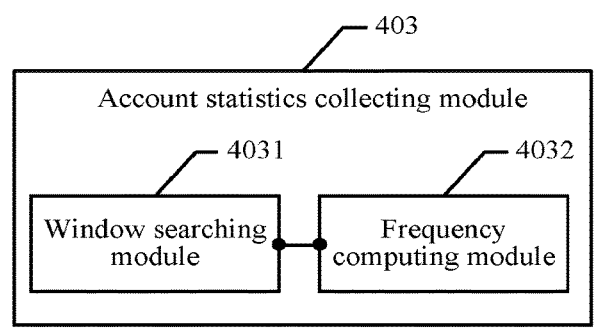
FIG. 4-b
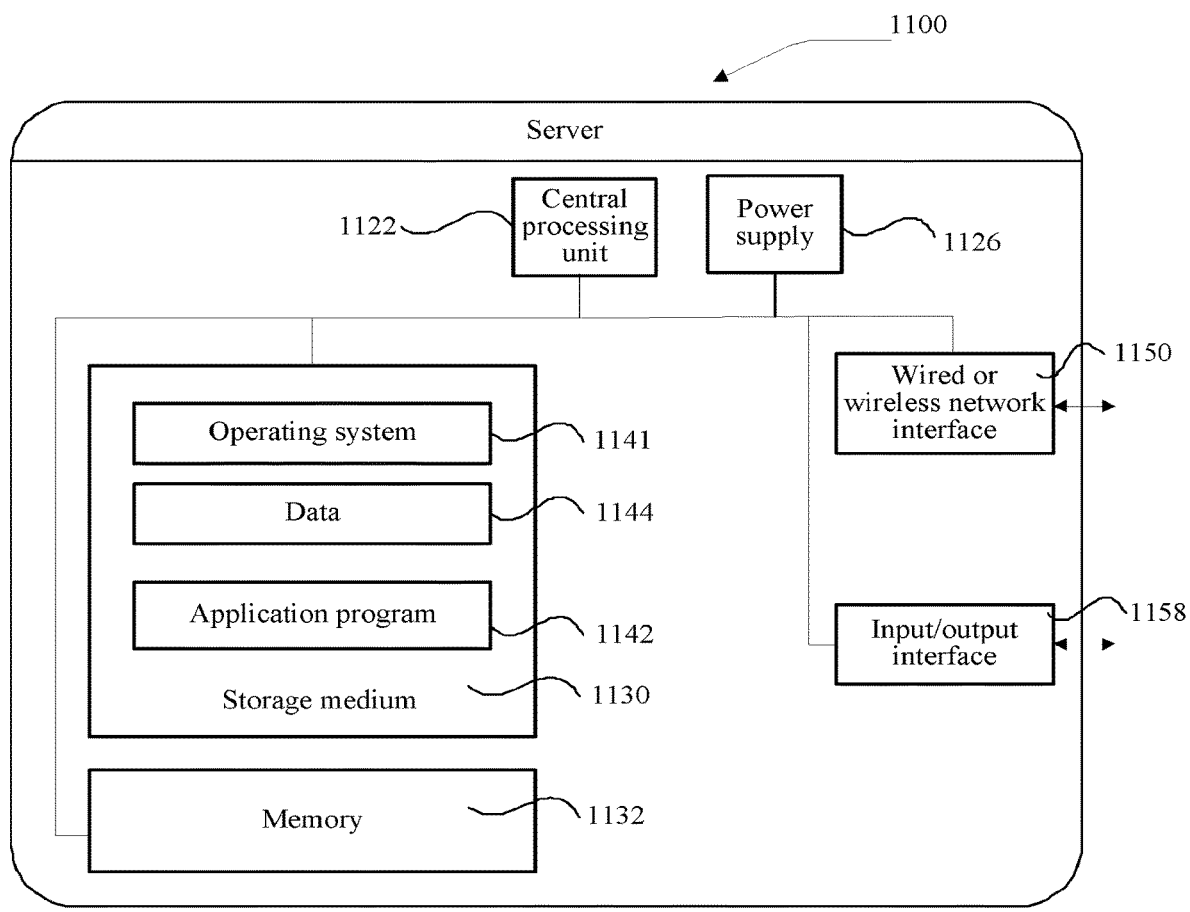
FIG. 5

NATIVE OBJECT IDENTIFICATION METHOD AND APPARATUS

RELATED APPLICATION

This application is a continuation of International Application No. PCT/CN2018/079243, filed on Mar. 16, 2018, which claims priority to Chinese Patent Application No. 201710358639.0, entitled "NATIVE OBJECT IDENTIFICATION METHOD AND APPARATUS" filed with the Chinese Patent Office on May 19, 2017. The entire disclosures of the prior applications are hereby incorporated by reference in their entirety.

FIELD OF THE TECHNOLOGY

The present disclosure relates to the field of computer technologies.

BACKGROUND OF THE DISCLOSURE

In current topic ranking procedures, a native article is identified for each topic on a topic ranking list. A native article identification method in the related technology is to determine an article having a largest quantity of WeChat Moments reposts or sharing to be the native article of the associated topic.

The native article identification method provided in the related technology assumes that a topic is widely spread because of explosive reposts of a native article itself. However, in analysis on actual problems, it is found that such an assumption usually does not hold. For example, a specific topic appearing on a topic ranking list may be caused by a re-posting of an article by a first account (an account registered on the WeChat platform) instead of an original posting of a native article by a second account, because the first account is more influential and has more followers. In this context, the originally posted article is referred to as a native article of the second account, and a non-native article of the first account. According to the related technology, the non-native article that is reposted by the first account is incorrectly identified as a native article, resulting in a possible identification error in the native article identification method in the related technology and relatively low native article identification accuracy.

SUMMARY

A native object identification method is described. A first topic from a social network can be determined. The social network can be searched for M objects associated with the first topic. M can be a positive integer. A frequency of appearances of each application account in the M objects is counted to obtain top N application accounts having highest frequencies of appearances. N can be a positive integer. According to an account filter rule, a first application account is identified from the top N application accounts having highest frequencies of appearance. An object associated with the first topic and posted by the first application account is determined as a native object.

An apparatus for identifying a native object can include circuitry. The circuitry can be configured to determine a first topic from a social network, and search the social network for M objects associated with the first topic. M can be a positive integer. The circuitry can be further configured to count a frequency of appearances of each application account in the M objects to obtain top N application accounts having highest frequencies of appearances. N can be a positive integer. According to an account filter rule, a first application account can be identified from the top N application accounts having highest frequencies of appearance. An object associated with the first topic and posted by the first application account can be determined as a native object.

A non-transitory computer-readable medium is provided. The medium can store a program that is executable by a processor to perform the native object identification method.

BRIEF DESCRIPTION OF THE DRAWINGS

To describe the technical solutions in the embodiments of the present disclosure, the following briefly introduces the accompanying drawings for describing the embodiments. The accompanying drawings in the following description show merely some embodiments of the present disclosure, and a person skilled in the art may still derive other drawings from these accompanying drawings.

FIG. 3 is an example of searching an object for an application account according to an embodiment of the present disclosure.

FIG. 4-*a* is a native object identification apparatus according to an embodiment of the present disclosure.

FIG. 4-*b* is an account statistics collecting module according to an embodiment of the present disclosure.

FIG. 5 is an apparatus implementing a native object identification method according to an embodiment of the present disclosure.

DESCRIPTION OF EMBODIMENTS

Embodiments of the present disclosure provide a native object identification method and apparatus, to improve native object identification accuracy.

To make the disclosure objectives, features, and advantages of the present disclosure clearer and more comprehensible, the following describes the technical solutions in the embodiments of the present disclosure with reference to the accompanying drawings in the embodiments of the present disclosure. The embodiments described in the following are merely some rather than all of the embodiments of the present disclosure. All other embodiments obtained by a person skilled in the art based on the embodiments of the present disclosure shall fall within the protection scope of the present disclosure.

The terms "include", "have", and any variants thereof in the specification, claims, and the foregoing accompanying drawings of the present disclosure are intended to cover a non-exclusive inclusion. Therefore, a process, method, system, product, or device that includes a series of units does not need to be limited to such units, but may include other units that are not listed or that are inherent to the process, method, product, or device.

Figure 1:
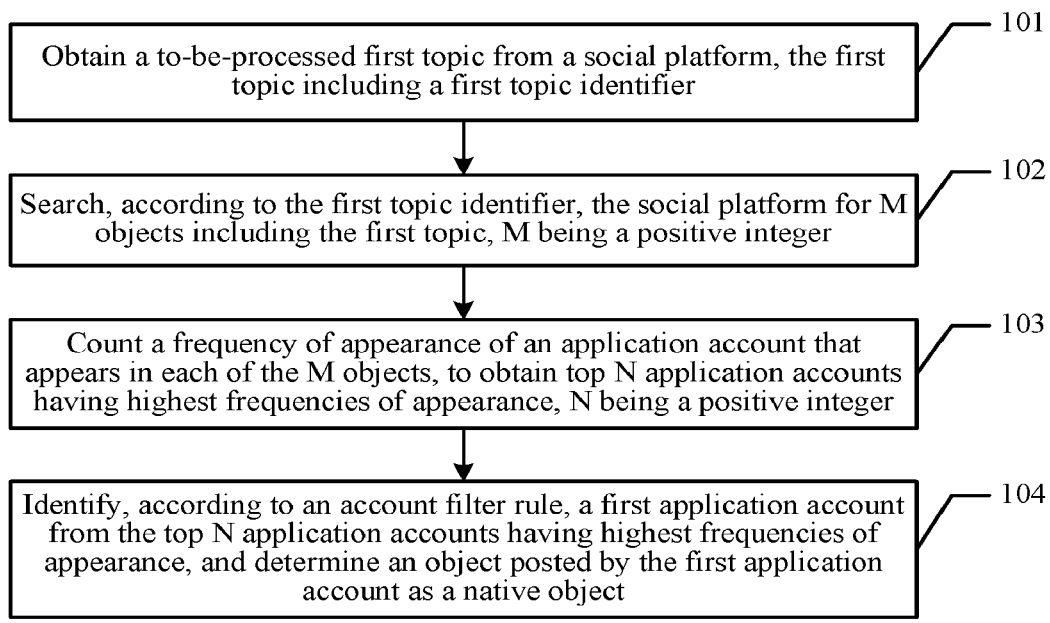
FIG. 1 shows a procedure of a native object identification method according to an embodiment of the present disclosure.

In an embodiment, a native object identification method is used on a social platform. An object on the social platform may be electronic data, such as an article, a picture, a video, and a book, posted or reposted on a social platform. A native object can refer to an object that is original and initially posted on a social platform. In contrast, a non-native object can be a reposting of a native object. Referring to FIG. 1, a native object identification method provided in an embodiment of the present disclosure may include the following steps:

101. Obtain a to-be-processed first topic from a social platform (e.g., a social network). The first topic can be associated with a first topic identifier. For example, a first topic is determined from a social network.

In this embodiment, the social platform may be a platform on which users interact with each other based on a social application program. For example, the social platform may be an instant messaging network such as a WeChat platform or a QQ platform. When using a social platform, a user may perform interactive actions such as browsing posted content (e.g., browsing Moments which is a posting service of WeChat), posting an article, reposting an article, and commenting on an article. The social platform stores a large amount of historical data provided by users. A user can register an application account with a social platform. For example, a WeChat official account is an application account applied for by a developer or a merchant on a WeChat public platform. The account can be associated with, for example, a QQ account, by using the official account, the merchant may implement communication and interaction with a particular user group by using text, pictures, audio, and videos, thereby forming an online-to-offline WeChat interaction.

In some examples, the application account may alternatively be a cross-platform account, for example, an application account registered on a social networking platform A may log in to another social platform B, and then, may alternatively obtain or view a to-be-processed first topic on the social platform B. It is noted that in this embodiment of the present disclosure, the application account is not limited to an account registered with a particular platform, but may alternatively be an account associated with any social platform. For example, a topic can be a collective name of a specific event on the Internet. For example, "North Korea nuclear test", "Luo Yixiao, stay standing for me", or the like each is a specific topic. One topic identifier may be allocated to each topic on the social platform. The topic identifier is a unique identifier of the topic, and a corresponding topic may be represented or identified by using the identifier. For example, a first topic identifier is allocated to the first topic. In some examples, a topic itself is used as the topic identifier.

In some embodiments of the present disclosure, in step 101, the obtaining a to-be-processed first topic from a social platform can include the following steps:

A1. Cluster a plurality of topics spreading (e.g. trending) on the social platform, and determine the first topic according to a clustering result.

The first topic may be determined by using a clustering algorithm. For example, text information may be effectively organized, abstracted, and navigated by using a text clustering algorithm according to the following clustering assumption: Documents of a same type have a relatively high similarity, and documents of different types have a relatively low similarity. The clustering algorithm results in clustering a plurality of pieces of topic text on the social platform, and performing processing, such as redundancy elimination, information fusion, and text generation, on documents of a same subject, to generate a concise abstract document.

In an example described below, it can be identified, by counting a repost quantity in Moments and through text clustering algorithms for topics, that "Luo Yixiao, stay standing for me" at the beginning of December 2016 is a topic having a native article to be identified. The text clustering algorithm provided in this embodiment of the disclosure may be classified into a partitioning clustering algorithm (such as k-means) and a hierarchical clustering algorithm. Using the hierarchical clustering algorithm as an example, the hierarchical clustering algorithm may be classified into a bottom-up agglomerative clustering algorithm and a top-down divisive clustering algorithm. In this embodiment of the present disclosure, using the divisive clustering algorithm (e.g., the DIANA algorithm) as an example, first, all objects are initialized into one cluster, and then, the cluster is classified according to some principles (e.g., the nearest maximum Euclidean distance) until a user-specified quantity of clusters is reached or a distance between two clusters exceeds a specific threshold.

According to some embodiments, the following two definitions are used in the DIANA algorithm: (1) a diameter of a cluster: there is a Euclidean distance between any two data points in a cluster, and a largest value of the distances is the diameter of the cluster; and (2) an average dissimilarity: an average Euclidean distance.

An embodiment of the DIANA algorithm is described as follows:

Input: a database including n objects, where a termination condition is a quantity k of clusters.

Output: k clusters, reaching the quantity of clusters specified by the termination condition.

(1) Use all objects together as an initial cluster.

(2) Execute a statement: For (i=1; i!=k; i++) Do Begin.

(3) Select a cluster having a largest diameter from all clusters.

(4) Find, in the selected cluster, a point having a largest average dissimilarity with other points to put the point into a splinter group and put the remaining points into an old party.

(5) Perform the foregoing step (1) to step (4) again.

(6) Find, in the old party, a point having a shortest distance to a point in the splinter group not greater than a shortest distance to a point in the old party, and add the point to the splinter group.

(7) Until no new point in the old party is allocated to the splinter group.

(8) The splinter group and the old party are selected clusters, and are splintered into two clusters, and the two clusters form, together with other clusters, a new cluster set.

(9) End.

By using the foregoing DIANA algorithm, a plurality of topics spreading on the social platform can be clustered, and a first topic can be determined according to the clustering result.

102. Search, according to the first topic identifier, the social platform for M objects including the first topic. M can be a positive integer.

In this embodiment of the disclosure, historical interaction data of users is stored on the social platform, and each piece of interaction data is stored as an object on the social platform. After the first topic is determined, the social platform is searched, according to the first topic identifier (or the first topic determined based on the first topic identifier), to find the M objects including the first topic identifier (or the first topic represented by the first topic identifier). A specific value of M depends on user interaction data generated on a specific social platform. The M objects that are found by searching the social platform each include the first topic.

Figure 2:
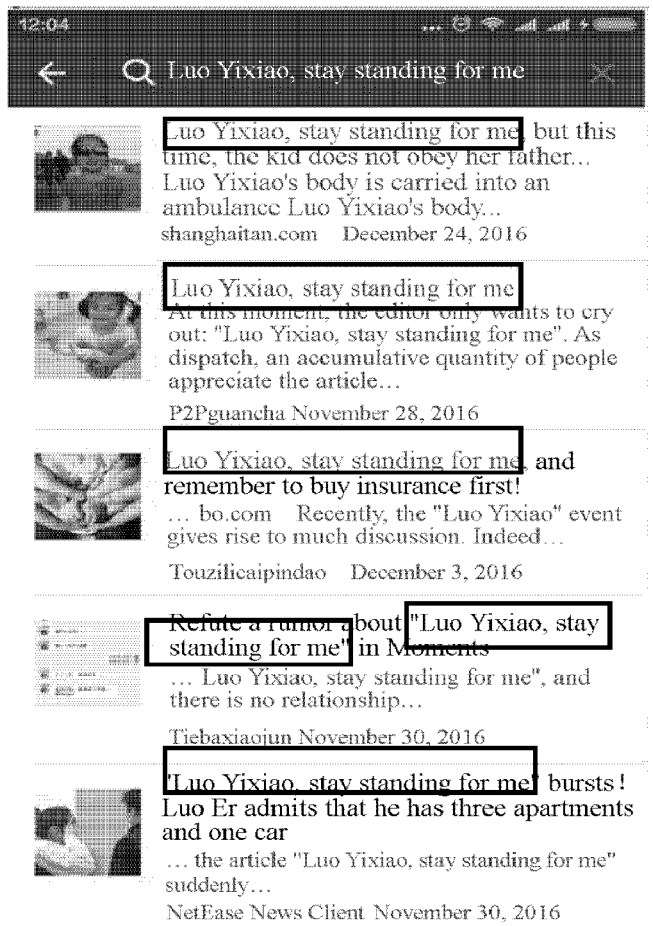
FIG. 2 is an example of searching a social platform for M objects according to an embodiment of the present disclosure.

For example, the M objects can be related to a same topic. For example, FIG. 2 is a schematic diagram of an implementation scenario of searching a social platform for M objects according to an embodiment of the present disclosure. In the example, the objects topic articles. After a database of a social platform is searched by using "Luo Yixiao, stay standing for me" as the first topic, a plurality of topic articles may be obtained. For example, in FIG. 2, an official account 1 is shanghaitan.com, which reposts the topic "Luo Yixiao, stay standing for me" on Dec. 24, 2016; an official account 2 is P2Pguancha, which reposts the topic "Luo Yixiao, stay standing for me" on Nov. 28, 2016; an official account 3 is Touzilicaipindao, which reposts the topic "Luo Yixiao, stay standing for me" on Dec. 3, 2016; an official account 4 is Tiebaxiaojun, which reposts the topic "Luo Yixiao, stay standing for me" on Nov. 30, 2016; and an official account 5 is NetEase News Client, which reposts the topic "Luo Yixiao, stay standing for me" on Nov. 30, 2016.

In this embodiment of the present disclosure, the first topic is a topic having an original object (e.g. a native article of the first topic) to be identified. The social platform is searched by using the first topic identifier. A database of the social platform may be searched to find objects including the first topic (e.g., including text of the first topic). An example in which a quantity of objects found by searching the social platform is M is used for description. The M objects each include the first topic, and the M objects may be used for counting a frequency of appearance of a set of application accounts. Refer to subsequent step 103 for details. By searching the social platform according to the first topic, M objects used for identifying a native object may be found on the social platform, so that the native object can be accurately found in subsequent steps.

103. Collect statistics (e.g. appearing frequency) of an application account that appears in the M objects, to obtain top N application accounts having highest frequencies of appearance. N can be a positive integer.

In this embodiment of the present disclosure, after the M objects including the first topic are found by searching the social platform, each of the M objects can be analyzed, and the analysis is performed on an account name of an application account included in each object and a frequency of appearance of each application account. In an example described below, a total of three objects need to be analyzed: an object 1, an object 2, and an object 3. The object 1 includes an application account 1, an application account 2, and an application account 3, the object 2 includes the application account 2 and the application account 3, and the object 3 includes the application account 1 and the application account 3. By analyzing the foregoing three objects, it is counted that a total of three application accounts appear in the foregoing three objects, where the application account 1 appears twice, the application account 2 appears twice, and the application account 3 appears three times.

FIG. 3 is a schematic diagram of an implementation scenario of searching an object to find an application account according to an embodiment of the present disclosure. An example is provided below for describing searching an object for an application account. In the example, the object is a topic article, the first topic is "Luo Yixiao, stay standing for me". FIG. 3 shows a schematic diagram of article content of the topic article. The topic article includes a text of "WeChat official account "Luo Er"", and a title of "Luo Yixiao, stay standing for me". By searching for the topic article including the topic shown in FIG. 3, it can be counted that a frequency of appearance of the WeChat official account "Luo Er" is 1.

In this embodiment of the present disclosure, an application account that appears in each object is used as a keyword for statistics collection, so that top N application accounts having highest frequencies of appearance can be accurately calculated. In this embodiment of the present disclosure, N application accounts are obtained by statistics collection from the M objects by using the application account as a keyword. The N application accounts may be potential application accounts posting the native object. For example, the N application accounts that have the highest frequencies of appearance and that are sifted out may include an application account that posts the native object of the first topic. A specific value of N depends on specific content included in M objects generated on a specific social platform.

In some embodiments of the present disclosure, in step 103, the collecting statistics of an application account that appears in each of the M objects can include the following steps:

B1. Sequentially slide a window at a sliding interval on each of the M objects to search sub-objects covered by the window to determine whether the application account appears.

B2. Count a frequency at which the application account appears in all sub-objects, where one object is divided by sliding of a count window into a plurality of sub-objects.

A slidable window is set on each object. First, a window size is defined. For example, the window size is 100 words. The window sequentially slides at a sliding interval on the object. If the sliding interval is set to 100 words, each time, the window slides on the object by 100 words. For each time the window stays on the object, the window may separate a sub-object from the object, where all the content of the sub-object may be located inside the window. The sub-object covered by the window is searched to determine whether an application account appears, and subsequently, a frequency of appearance of the application account in all sub-objects is counted.

An example is provided below for description, in which an object is a topic article, and an application account is a WeChat official account. In this embodiment of the present disclosure, N identified potential official accounts posting a native article are presented together through a window. As shown in FIG. 3, all topic articles including the topic "Luo Yixiao, stay standing for me" are analyzed, and statistics are collected to obtain a set of official account names that appear around topic_title (Luo Yixiao, stay standing for me) of the article in a specific window in the text. The window herein is a sliding window having a size K. For example, if a value of K is set to 100 words, a window having a size of 100 words can be obtained. A name and a frequency of appearance of a WeChat official account may be obtained by statistics collection within 100 words before and after the window. As the window continuously moves, all official accounts that appear in one object can be obtained by statistics collection. For example, the following information is obtained by statistics collection: "topic_title, official account name 1", "topic_title, official account name 2", and "topic_title, official account name 3". Top N potential official accounts (that is, the top N) posting the topic article can be obtained by counting and ranking frequencies of the foregoing official account names, and a frequency is a number of times a specific official account name appears in the window. In some embodiments, a value of N is a quantity of official accounts that appear in the window, and the N official accounts form a set of potential official account names posting the native article.

104. Identify, according to a preset account filter rule, a first application account from the top N application accounts having highest frequencies of appearance, and determine an object posted by the first application account as a native object.

In this embodiment of the present disclosure, top N application accounts having highest frequencies of appearance are obtained through step 103. The N application accounts may be further filtered by using an account filter rule, so that a specific application account may be sifted (filtered) out from the N application accounts. For ease of description, the sifted application account is defined as a "first application account", and an object associated with the first topic and posted by the first application account is a native object associated with the first topic. The account filter rule provided in this embodiment of the present disclosure is a sifting rule used for filtering application accounts. The account filter rule may include filtering an account feature used by an application account, an object feature, interaction data of a social platform, and the like. The account filter rule provided in this embodiment of the present disclosure may be at least one of a plurality of filter rules. For example, the account filter rule may be a single filter rule or a combination of a plurality of filter rules. The native object in this embodiment of the present disclosure may alternatively be referred to as a native article of a concerned topic, and the native object is an object of a specific topic that appears the earliest in a social platform.

An example is provided below for description, in which an object is a topic article, and an application account is a WeChat official account. Searches are made in the foregoing top N potential official accounts to determine whether a title corresponding to the native article exists. For example, a topic name: "Luo Yixiao, stay standing for me" is searched for, to obtain, for example, an article related to "Luo Yixiao, stay standing for me" and its posting time, and determine whether its posting time falls within an early time period of a burst of the topic. The time period is a time period at which the new topic is aggregated in a topic text cluster, that is, an earliest time period of posting the article that is obtained by searching for the title. Further, rule-based filtering is performed with reference to features such as a repost quantity in Moments during the posting and whether the article is original. A Uniform Resource Locator (URL) of a unique native article is identified.

In some embodiments of the present disclosure, in step 104, the identifying a first application account from the top N application accounts having highest frequencies of appearance according to a preset account filter rule includes the following step:

C1. Filter, according to a topic burst time period filter rule, an application account having a posting time that is in or after a first burst time period out of the top N application accounts having highest frequencies of appearance, to obtain the first application account, where the first burst time period is a burst time period of the first topic.

In an example in which the account filter rule is specifically a topic burst time period filter rule, an application account having a posting time that is in or after a first burst time period is filtered out of the N application accounts, an application account having a posting time before the first burst time period is reserved, and the reserved application account may be the first application account.

In some embodiments of the present disclosure, in step 104, the identifying a first application account from the top N application accounts having highest frequencies of appearance according to a preset account filter rule includes the following step:

C2. Filter, according to a repost quantity or comment quantity filter rule, an application account having a repost quantity less than a repost threshold or having a comment quantity less than a comment threshold out of the top N application accounts having highest frequencies of appearance, to obtain the first application account.

In an example in which the account filter rule is a repost quantity or comment quantity filter rule, an application account having a repost quantity that is less than a repost threshold or having a comment quantity that is less than a comment threshold is filtered out of the N application accounts, only an application account having the repost quantity that is greater than or equal to the repost threshold or having the comment quantity that is greater than or equal to the comment threshold is reserved, and the reserved application account may be the first application account. The repost threshold and the comment threshold may be specifically determined according to an application scenario.

In some embodiments of the present disclosure, in step 104, the identifying a first application account from the top N application accounts having highest frequencies of appearance according to a preset account filter rule includes the following step:

C3. Filter, according to an originality identifier filter rule, an application account that does not have an originality identifier out of the top N application accounts having highest frequencies of appearance, to obtain the first application account.

In an example in which the account filter rule is an originality identifier filter rule, an application account that does not have an originality identifier is filtered out of the N application accounts, only an application account that has an originality identifier is reserved, and the reserved application account may be the first application account. The originality identifier may be carried on an object posted by an application account, and a specific position of the originality identifier on the object may be determined according to an application scenario. For example, an originality identifier may be added to the object when an owner of the account posts the object that is an original object (e.g., original article).

It is noted that in the foregoing embodiment of the present disclosure, step C1, step C2, and step C3 respectively describe a determining process of a first application account from perspectives of different account filter rules. The account filter rule provided in this embodiment of the present disclosure may be at least one of a plurality of filter rules. For example, the account filter rule may be a single filter rule or a combination of a plurality of filter rules. For example, the foregoing step C1, step C2, and step C3 may be combined together to determine the first application account.

An example is provided below, in which an object is a topic article, and an application account is a WeChat official account. For example, a set of candidate native articles obtained by searching the top N application accounts is {O}, including a total of 759 articles. For example, the candidate native articles are each titled "Luo Yixiao, stay standing for me" when posted in the associated application accounts, and are thus, selected from postings of the top N application accounts, and the following account filter rules are needed to identify the unique native article. Filtering may be performed according to the following rules:

Rule 1: Filtering is performed according to a topic burst time period. By searching and topic clustering, it can be learned that an article of the topic "Luo Yixiao, stay standing for me" is widely spread on social media, such as Moments, from Nov. 25, 2016 to Nov. 28, 2016. By comparing posting times of articles in {O}, the set of candidate native articles can be reduced from 759 articles to 180 articles.

Rule 2: Filtering is performed according to a repost quantity in Moments. The foregoing 180 articles are ranked according to a repost quantity in Moments, to obtain top two articles ranking highest as a new set of candidate native articles that are further reduced, where the two articles are:

"Luo Yixiao, stay standing for me" posted by an official account "P2Pguancha" has a repost quantity of one million.

"Luo Yixiao, stay standing for me" posted by an official account "Luo Er" has a repost quantity of more than a hundred thousand.

Rule 3: Filtering is further performed according to whether an article is original:

"Luo Yixiao, stay standing for me" posted by the official account "P2Pguancha" does not have an originality identifier.

"Luo Yixiao, stay standing for me" posted by an official account "Luo Er" has an originality identifier. Thus, the article posted by the official account "Luo Er" can be determined to be the original object. For example, the original article posted on the official account "Luo Er" can have an address to be accessed by users. For example, the address can be a URL address: http: //mp.weixin.qq.com/s/o4Zhq8jqxqFVcFIwf4g5rw.

Top N WeChat official accounts may be filtered by using the foregoing three account filter rules, and it can be identified that the native article corresponding to the topic is the article posted by "Luo Er": http: //mp.weixin.qq.com/s/o4Zhq8jqxqFVcFIwf4g5rw.

It can be learned from the description about the embodiments of the present disclosure by using the foregoing embodiment that a native object identification technology is introduced to the embodiments of the present disclosure, to resolve a problem in the related technology there the identification of topics is inaccurate. In the embodiments of the present disclosure, the social platform may be searched for M objects according to the first topic identifier. The M objects may be used for counting a frequency of appearance of each application account, an application account that appears in each object is used as a keyword for statistics collection, to accurately calculate top N application accounts having highest frequencies of appearance, and the first application account is selected by using an account filter rule. The object posted by the first application account is the native object identified in the embodiments of the present disclosure.

In the embodiments of the present disclosure, N application accounts are obtained by statistics collection from the M objects by using the application account as a keyword. The N application accounts are potential application accounts posting the native object, and further, a first application account is sifted out from the N application accounts. Therefore, the sifted first application account is a more accurate account posting the native object. Therefore, native object identification accuracy is improved. Compared with the related technology, in the embodiments of the present disclosure, the sifted N application accounts are potential application accounts posting the native object. Accurate identification of the native object is not affected regardless of whether a specific topic appears because of explosive reposts of the native object itself.

It is noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also learn that the embodiments described in this specification are exemplary embodiments, and the related actions and modules are not necessarily required in the present disclosure.

To better implement the foregoing solutions in the embodiments of the present disclosure, the following further provides related apparatuses configured to implement the foregoing solutions.

Referring to FIG. 4-a, a native object identification apparatus 400 provided in the embodiments of the present disclosure may include: a topic obtaining module 401, an object searching module 402, an account statistics collecting module 403, and an account filtering module 404.

The topic obtaining module 401 is configured to obtain a to-be-processed first topic from a social platform, the first topic including a first topic identifier.

The object searching module 402 is configured to search, according to the first topic identifier, the social platform for M objects including the first topic, M being a positive integer.

The account statistics collecting module 403 is configured to collect statistics of an application account that appears in each of the M objects, to obtain top N application accounts having highest frequencies of appearance, N being a positive integer.

The account filtering module 404 is configured to: identify a first application account from the top N application accounts having highest frequencies of appearance according to a preset account filter rule, and determine an object posted by the first application account as a native object.

In some embodiments of the present disclosure, the topic obtaining module 401 is configured to: cluster a plurality of topics spread on the social platform, and determine the first topic according to a clustering result.

In some embodiments of the present disclosure, referring to FIG. 4-b, the account statistics collecting module 403 can include a window searching module 4031 and a frequency computing module 4032. The window searching module 4031 can be configured to sequentially slide a window at a sliding interval on each of the M objects to search subobjects covered by the window to determine whether the application account appears. The frequency computing module 4032 can be configured to count a frequency at which the application account appears in all sub-objects, where one object is divided by sliding of a count window into a plurality of sub-objects.

In some embodiments of the present disclosure, the account filtering module 404 is configured to filter, according to a topic burst time period filter rule, an application account having a posting time that is in or after the first burst time period out of the top N application accounts having highest frequencies of appearance, to obtain the first application account, where the first burst time period is a burst time period of the first topic.

In some embodiments of the present disclosure, the account filtering module 404 is configured to filter, according to a repost quantity or comment quantity filter rule, an application account having a repost quantity less than a repost threshold or having a comment quantity less than a comment threshold out of the top N application accounts having highest frequencies of appearance, to obtain the first application account.

In some embodiments of the present disclosure, the account filtering module 404 is configured to filter, according to an originality identifier filter rule, an application account that does not have an originality identifier out of the top N application accounts having highest frequencies of appearance, to obtain the first application account.

In the embodiments of the present disclosure, first, a to-be-processed topic is obtained from a social platform. The first topic can include a first topic identifier. Then, the social platform is searched according to the first topic identifier for M objects including the first topic. M can be a positive integer. Subsequently, statistics of an application account that appears in each of the M objects are collected to obtain top N application accounts having highest frequencies of appearance. N can be a positive integer. A first application account is subsequently identified according to a preset account filter rule from the top N application accounts having highest frequencies of appearance. An object posted by the first application account is determined as a native object.

In the embodiments of the present disclosure, the social platform may be searched, according to the first topic identifier, for M objects. The M objects may be used for counting a frequency of appearance of each application account, an application account that appears in each object is used as a keyword for statistics collection, so as to accurately calculate top N application accounts having highest frequencies of appearance, and the first application account is selected by using an account filter rule. The object posted by the first application account is the native object identified in the embodiments of the present disclosure. In the embodiments of the present disclosure, N application accounts are obtained by statistics collection from the M objects by using the application account as a keyword. The N application accounts are potential application accounts posting the native object, and further, a first application account is sifted out from the N application accounts. Therefore, the sifted first application account is a more accurate account posting the native object. Therefore, native object identification accuracy is significantly improved. Compared with the related technology, in the embodiments of the present disclosure, the sifted N application accounts are potential application accounts posting the native object. Accurate identification of the native object is not affected regardless of whether a specific topic appears because of a high popularity of the native object itself.

FIG. 5 is a schematic structural diagram of a server according to an embodiment of the present disclosure. The server 1100 may vary greatly due to different configurations or performance, and may include processing circuitry such as one or more central processing units (CPU) 1122 (for example, one or more processors) and a memory 1132, and one or more storage media 1130 (for example, one or more mass storage devices) that store an application program 1142 or data 1144. The memory 1132 and the storage medium 1130 may be non-transitory storage media (transient or persistent storages). The program stored in the storage medium 1130 may include one or more modules (not shown), and each module may include a series of instructions and operations for the server. Still further, the central processing unit 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, or FreeBSD™.

The steps of the native object identification method performed by the server in the foregoing embodiments may be based on the server structure shown in FIG. 5.

It is additionally noted that the apparatus embodiments described above are merely illustrative. The units used as separate parts may or may not be physically separate, and the parts displayed as units may or may not be physical units, may be located at one position, or may be distributed on a plurality of network units. Some or all of the modules may be selected according to actual needs to achieve the objectives of the solutions of the embodiments. In addition, in the accompanying drawings of the apparatus embodiments provided in the present disclosure, a connection relationship between modules indicates that there is a communication connection between them, and may be specifically implemented as one or more communications buses or signal cables. The above can be understood and implemented by a person of ordinary skill in the art.

Based on the foregoing descriptions of the implementations, a person skilled in the art may clearly understand that the present disclosure may be implemented by software in addition to universal hardware. Certainly, the present disclosure may alternatively be implemented by specific hardware including an application-specific integrated circuit, a dedicated CPU, a dedicated memory, a dedicated element, and the like. Generally, any function implemented by a computer program can easily be implemented by using corresponding hardware. In addition, various specific hardware structures may alternatively be used for implementing a same function, and may be, for example, an analog circuit, a digital circuit, or a dedicated circuit. Based on such understanding, the technical solutions of the present disclosure or the part that makes contributions to the related technology can be substantially embodied in the form of a software product. The computer software product is stored in a readable storage medium such as a floppy disk, a read-only memory (ROM), a random access memory (RAM), a flash memory, a hard disk, or an optical disc of the computer, and includes several instructions used to enable a computer device (for example, a personal computer, a server, or a network device) to perform the methods according to the embodiments of the present disclosure.

In conclusion, it is noted that the above embodiments are merely provided for describing the technical solutions of the present disclosure, but not intended to limit the present disclosure. A person of ordinary skill in the art should understand that although the present disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the present disclosure.

What is claimed is:

1. A native object identification method, comprising:
   determining, by processing circuitry, a first topic from a social network;
   searching, by the processing circuitry, for M objects each being content posted by an application account in the social network and associated with the first topic, 114 being a positive integer;

counting, by the processing circuitry, a number of times each of plural application accounts appears in the M objects by using the respective application account as a keyword to search the M objects, one of the application accounts being counted as appearing twice for one of the M objects that cites the one of the application accounts twice;

determining N application accounts having highest numbers of appearances among the application accounts referenced in the M objects, N being a positive integer;

identifying, by the processing circuitry, according to an account filter rule, a first application account from the N application accounts having the highest numbers of appearances among the application accounts referenced in the M objects; and determining an object, that is associated with the first topic and posted by the first application account, as a native object that is initially posted in the social network, wherein the counting includes:
sequentially sliding a window at a sliding interval on each of the M objects to determine whether any of the application accounts referenced in the M objects are referenced in the window, and
counting a number of appearances of each application account reference in the window.

2. The method according to claim 1, wherein the determining the first topic comprises:
clustering a plurality of topics spreading in the social network to obtain a clustering result; and
determining the first topic according to the clustering result.

3. The method according to claim 1, wherein the identifying comprises:
filtering an application account having a posting time of an object comprising the first topic that is after a first burst time period of the first topic out of the N application accounts having the highest numbers of appearances.

4. The method according to claim 1, wherein the identifying comprises:
filtering an application account having a repost quantity of an object comprising the first topic less than a first threshold out of the N application accounts having the highest numbers of appearances.

5. The method according to claim 1, wherein the identifying comprises:
filtering an application account having a comment quantity of an object comprising the first topic less than a second threshold out of the N application accounts having the highest numbers of appearances.

6. The method according to claim 1, wherein the identifying comprises:
filtering an application account that does not have an originality identifier carried on an object comprising the first topic out of the N application accounts having the highest numbers of appearances.

7. An apparatus for identifying a native object, comprising circuitry configured to:
determine a first topic from a social network;
search for M objects each being content posted by an application account in the social network and associated with the first topic, M being a positive integer;
count a number of times each of plural application accounts appears in the M objects by using the respective application account as a keyword to search the M objects, one of the application accounts being counted as appearing twice for one of the M objects that cites the one of the application accounts twice;

determine N application accounts having highest numbers of appearances among the application accounts referenced in the M objects, N being a positive integer;

identify, according to an account filter rule, a first application account from the N application accounts having the highest numbers of appearances among the application accounts referenced in the M objects; and determine an object, that is associated with the first topic and posted by the first application account, as the native object that is initially posted in the social network, wherein the circuitry is further configured to:
sequentially slide a window at a sliding interval on each of the M objects to determine whether any of the application accounts referenced in the M objects are referenced in the window, and
count a number of appearances of each application account reference in the window.

8. The apparatus of claim 7, wherein the circuitry is further configured to:
cluster a plurality of topics spreading in the social network to obtain a clustering result; and
determine the first topic according to the clustering result.

9. The apparatus of claim 7, wherein the circuitry is further configured to:
filter an application account having a posting time of an object comprising the first topic that is after a first burst time period of the first topic out of the N application accounts having the highest numbers of appearances.

10. The apparatus of claim 7, wherein the circuitry is further configured to:
filter an application account having a repost quantity of an object comprising the first topic less than a first threshold out of the N application accounts having the highest numbers of appearances.

11. The apparatus of claim 7, wherein the circuitry is further configured to:
filter an application account having a comment quantity of an object comprising the first topic less than a second threshold out of the N application accounts having the highest numbers of appearances.

12. The apparatus of claim 7, wherein the circuitry is further configured to:
filter an application account that does not have an originality identifier carried on an object comprising the first topic out of the N application accounts having the highest numbers of appearances.

13. A non-transitory computer-readable medium storing a program executable by a processor to perform a method of identifying a native object, the method comprising:
determining a first topic from a social network;
searching for M objects each being content posted by an application account in the social network and associated with the first topic, M being a positive integer;
counting a number of times each of plural application accounts appears in the M objects by using the respective application account as a keyword to search the M objects, one of the application accounts being counted twice for one of the M objects that cites the one of the application accounts twice;

determining N application accounts having highest numbers of appearances among the application accounts referenced in the M objects, N being a positive integer;

identifying according to an account filter rule, a first application account from the N application accounts having the highest numbers of appearances among the application accounts referenced in the M objects; and determining an object that is associated with the first topic and posted by the first application account, as the native object that is initially posted in the social network, wherein the counting includes:

sequentially sliding a window at a sliding interval on each of the M objects to determine whether any of the application accounts referenced in the M objects are referenced in the window, and counting a number of appearances of each application account reference in the window.

14. The non-transitory computer-readable medium of claim 13, wherein the determining the first topic comprises:

clustering a plurality of topics spreading in the social network to obtain a clustering result; and determining the first topic according to the clustering result.

15. The non-transitory computer-readable medium of claim 13, wherein the identifying comprises:

filtering an application account having a posting time of an object comprising the first topic that is after a first burst time period of the first topic out of the N application accounts having the highest numbers of appearances.

16. The non-transitory computer-readable medium of claim 13, wherein the identifying further comprises:

filtering an application account having a report quantity of an object comprising the first topic less than a first threshold out of the N application accounts having the highest numbers of appearances.

17. The non-transitory computer-readable medium of claim 4, wherein the identifying comprises:

filtering an application account having a comment quantity of an object comprising the first topic less than a second threshold out of the N application accounts having the highest numbers of appearances.

* * * * *